(12) United States Patent
Smeets et al.

(10) Patent No.: US 7,058,806 B2
(45) Date of Patent: Jun. 6, 2006

(54) METHOD AND APPARATUS FOR SECURE LEVELED ACCESS CONTROL

(75) Inventors: Bernhard Jan Marie Smeets, Dalby (SE); Kar-Fat Poon, Vellinge (SE); Marcus Bodensjo, Malmo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 726 days.

(21) Appl. No.: 09/821,533

(22) Filed: Mar. 29, 2001

(65) Prior Publication Data

US 2002/0059518 A1    May 16, 2002

Related U.S. Application Data

(60) Provisional application No. 60/241,070, filed on Oct. 17, 2000.

(51) Int. Cl.
*H04L 9/00* (2006.01)
*H04K 1/00* (2006.01)
*H04M 1/66* (2006.01)

(52) U.S. Cl. .................. 713/166; 380/30; 455/411
(58) Field of Classification Search ................ 713/166; 380/30; 455/410, 411
See application file for complete search history.

(56) References Cited

U.S. PATENT DOCUMENTS

| | | | |
|---|---|---|---|
| 4,200,770 A | 4/1980 | Hellman et al. | 178/22 |
| 4,405,829 A | 9/1983 | Rivest et al. | 178/22.1 |
| 4,748,668 A | 5/1988 | Shamir et al. | 380/30 |
| 5,606,315 A | 2/1997 | Gaskins | 340/825.34 |
| 5,825,890 A | 10/1998 | Elgamal et al. | 380/49 |
| 6,026,293 A * | 2/2000 | Osborn | 455/411 |
| 6,636,491 B1 * | 10/2003 | Kari et al. | 370/328 |

* cited by examiner

*Primary Examiner*—Matthew Smithers
*Assistant Examiner*—Courtney Fields

(57) ABSTRACT

Method and apparatus for providing secure, controlled access to one or more functions in an electronic system which may have a plurality of functions having different access requirements. A desired function is enabled according to the result of a first authentication process which uses a public key which corresponds to the desired function, and access to the function is authorized by a second authentication process which uses a second, private session key computed as a result of a random challenge made by the system to an external entity during the first authentication process. Additional protection is also provided against passive and active wiretapper attacks, such that only an entity that has received authorization can access the system at the correct access level.

33 Claims, 6 Drawing Sheets

METHOD AND APPARATUS FOR SECURE LEVELED ACCESS CONTROL

This application claims the benefit of U.S. Provisional Application Ser. No. 60/241,070 filed Oct. 17, 2000.

BACKGROUND OF THE INVENTION

1. Field of the Invention

The present invention relates generally to the protection of sensitive functions in an electronic device; and, more particularly, to a method and apparatus for providing secure, controlled access to one or more functions in an electronic device so as to prevent such functions from being accessed by unauthorized entities.

2. Description of the Prior Art

In many electronic devices, there is a need to protect certain functions within the devices from being accessible to unauthorized entities that may wish to activate or use those functions. For example, in many fixed and mobile computing and telecommunication systems, such as cellular telephones, PDAs (Personal Digital Assistants), and the like; it is important to provide a secure, controlled access to a variety of sensitive functions in the systems, including both software program functions and hardware functions.

In recognition of this important need for access control, a variety of protection mechanisms have been developed and are known and used in the prior art. In U.S. Pat. No. 5,606,315, for example, access to a dynamic data object is controlled via a password that is stored in an EEPROM. However, in the mechanism described in this patent, a user can easily read the password from the EEPROM; and, thus, can obtain unauthorized access to the capability of modifying the data.

In U.S. Pat. No. 6,026,293, a more advanced protection mechanism is taught that provides access control to the capability of reprogramming software in a device. In the mechanism of this patent, a public key cryptography scheme is used to avoid the problem of storing secret keys or passwords; however, the disclosed mechanism is not capable of providing different levels of access to different functions in the device that may have different security requirements, or that should not be shared among all entities that can successfully perform the authentication process.

Another important problem that exists with respect to securing the access to sensitive functions in a system is that data or commands sent to the system from even an authorized connecting entity, or sent from the system to the entity, is capable of being wiretapped during transit to/from the system. This creates the possibility, for example, for a passive wiretapper to monitor the data or commands, or for an active wiretapper to insert data or substitute sent data with his/hers/its own data. Known protection schemes do not adequately address such wiretapping problems.

In general, although existing protection mechanisms can be used to control access to a sensitive function in a system; such mechanisms lack the fine grain control capability and security demands that are required in more advanced systems.

SUMMARY OF THE INVENTION

The present invention provides a method and apparatus for ensuring a secure, controlled access to functions in an electronic system. A method according to the present invention provides controlled access to a desired function in a system which includes a plurality of functions, each of the functions having a corresponding key associated therewith, and comprises the steps of selecting a key corresponding to the desired function, conducting an authentication process which includes using the selected key, and controlling access to the desired function according to the result of the authentication process.

The present invention recognizes that many electronic systems may include a plurality of sensitive functions, and that different ones of the plurality of functions may have different access requirements. According to the present invention, therefore, access to each of a plurality of functions in a system requires authentication by a process which utilizes a particular key corresponding to each function. This permits access to each of the functions to be separately controlled such that an entity can only gain access to those functions to which he/she/it is authorized to gain access. With the present invention, one entity can be given access to one or more functions in the system and not to others, while another entity can be given access to a different function or functions.

According to a preferred embodiment of the invention, an entity desiring access to a function in a system first indicates to the system the desired function it wishes to access. The system then performs an authentication process utilizing a public key corresponding to the desired function; and if the process is successful, the function is enabled. The keys, an authentication code and codes for the plurality of functions in the system are stored internally in the system, preferably in either an internal read-only memory (IROM) in a processing device of the system, or in a one-time programmable part of a non-volatile program memory of the system.

According to a further embodiment of the invention, the step of conducting an authentication process comprises the step of conducting a first authentication process which includes using a first key, and the method further includes the step of conducting a second authentication process which includes using a second key which is generated using a second key code created during the first authentication process.

The present invention also recognizes that when a function is enabled through a successful authentication process, it is often the case that completion of the function requires additional input such as, for example, programming instructions or the like. In such situations, there is no real protection against wiretapping and/or manipulation of the additional data. In accordance with this embodiment of the invention, however, a second authentication process is conducted utilizing a second, private key, or session key, which is computed from a second key code, or session key code, established during the first authentication process. In order to obtain authorization for the additional input, an entity seeking the second authentication must know the second key; and since only the system and the entity that took part in the first authentication will know the second key, there is assurance that any additional data that is exchanged is indeed with the same entity that successfully performed the first authentication process. This embodiment, accordingly, protects against wiretappers who may wish to monitor or add or change data.

Preferably, the session key code is established as a result of a random challenge sent by the system to the entity during the first authentication process. The use of a random challenge makes it very unlikely that an entity can authenticate itself by replaying a recording of messages previously sent during a successful authentication. When, after the first authentication, an entity wants to communicate with the system, both the entity and the system compute a session key from the session key code, the computed keys are compared, and if they match, the second authentication is successful.

According to yet a further aspect of the invention, the established session key can be used to encrypt and decrypt the data sent between the entity and the system. This will protect the data against both passive and active attackers that wiretap the data channel between the entity and the system. The code for the encryption/decryption is preferably stored in a memory in the system in such a manner that it cannot be modified or bypassed so as to provide an even greater degree of protection.

In accordance with yet another embodiment of the invention, a Message Authentication Code (MAC) is used to detect an active wiretapper and to prevent the active wiretapper from inserting or substituting data in the data channel. The MAC can be used with or without the encryption of data as described above.

In general, the present invention provides a method and apparatus which allows secure, leveled access control over one or more functions in a system. The invention ensures that entities will be able to gain access to only those functions in the system to which access has been authorized; and also provides protection against both passive and active wiretapping activities that may occur.

Yet further advantages, objects and details of the present invention will become apparent hereinafter in conjunction with the following detailed description of presently preferred embodiments of the invention.

DETAILED DESCRIPTION OF PRESENTLY PREFERRED EMBODIMENTS

Figure 1:
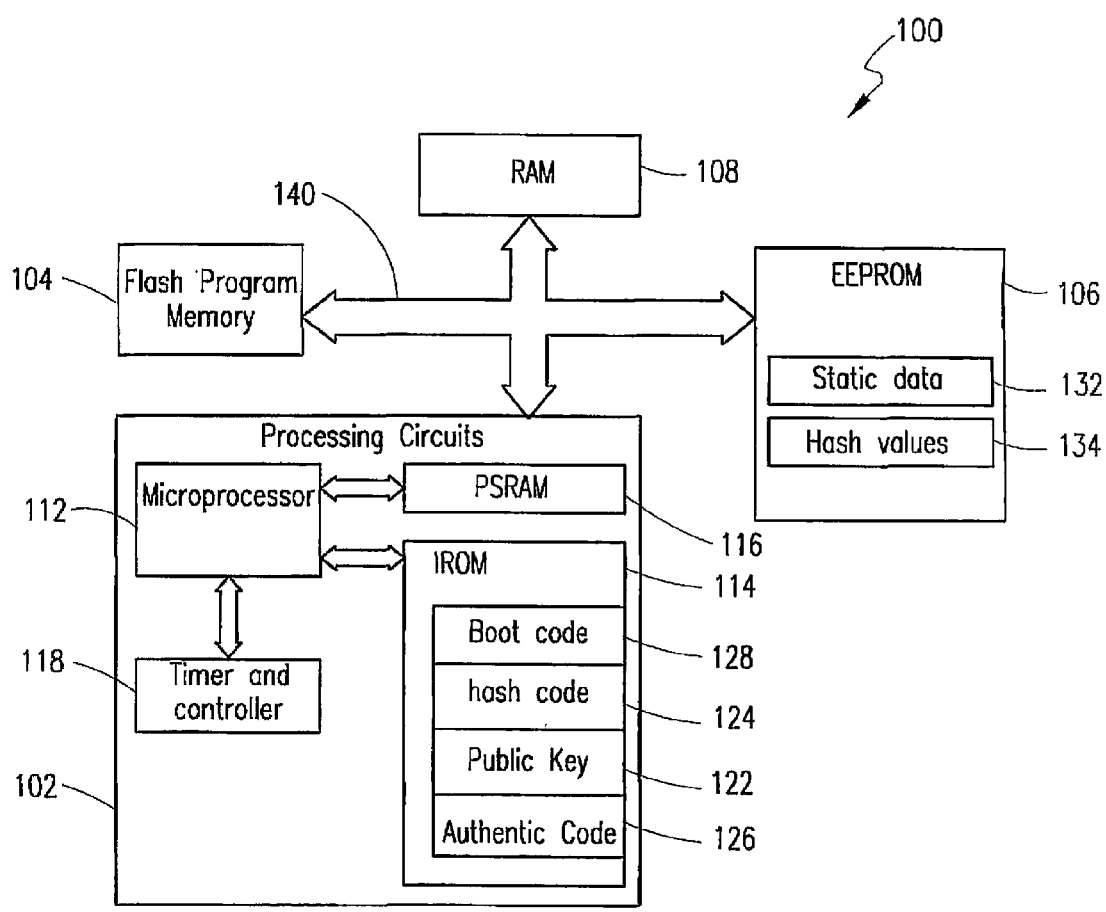
FIG. 1 schematically illustrates a known apparatus for providing controlled access to a function in the apparatus.

FIG. 1 schematically illustrates a known apparatus for providing controlled access to a function within the apparatus, and is provided to assist in explaining the present invention. More particularly, FIG. 1 illustrates a cellular telephone processor and memory arrangement of a cellular telephone system which incorporates a protection mechanism of the type disclosed in U.S. Pat. No. 6,026,293 for providing controlled access to a function within the system. The system is generally designated by reference number 100; and includes a processing device 102 which controls the overall operation of the cellular telephone, and which operates in conjunction with a plurality of memories including a flash program memory 104, an electronically erasable programmable read only memory (EEPROM) 106 and a random access memory (RAM) 108.

The processing device 102 itself includes a microprocessor 112, an internal read-only memory (ITOM) 114, a protected static random access memory (PSRAM) 116 and an interrupt controller and associated hardware-based timers, generally designated by reference number 118. The IROM 114 contains a public key 122, a code for a hash algorithm 124, a device authentication code 126, and a traditional boot code 128. As described in the patent, the interrupt controller and hardware-based timers 118 are provided to initiate periodic hash calculations by the microprocessor 112 on selected memory contents.

The EEPROM 106 contains various data including user profile data, Mobile Identification Number (MIN) data, and Electronic Serial Number (ESN) data, generally designated as static data 132, and a signed/unsigned valid hash value pair data 134. Instruction code involved with the general operation of the cellular telephone is contained in the flash program memory 104. The RAM 108 is used as a scratchpad for operations which are part of the normal cellular telephone call processing. Operations involving sensitive data, hash value calculations, and the authentication process are carried out in conjunction with the PSRAM 116.

The processing device 102 communicates with the flash program memory 104, the EEPROM 106 and the RAM 108 via the memory bus 140.

In the apparatus of FIG. 1, the hash algorithm 124 is used for providing integrity protection of the data stored in the EEPROM 106. In the context of the present invention, this protection mechanism is an example of a function inside the system 100 that should be accessible only to authorized entities (the term "entity" as used herein is intended to include persons as well as devices). The public key 122 and the authentication code 126 relate to the authentication mechanism that authenticates external entities that can reprogram the system.

In the apparatus of FIG. 1, and as described in U.S. Pat. No. 6,026,293, the authentication process requires that an external entity be in possession of a corresponding secret key of a public/private encryption scheme that is used to implement the authentication procedure. As indicated previously, this scheme avoids the problem of storing secret keys or passwords. The procedure disclosed in the patent, however, is not capable of providing different access to a plurality of functions in the system that may have different security requirements or that should otherwise not be shared among all entities that can successfully perform the authentication process. For example, in a cellular telecommunications system; it might be desired that one class of functions in the system be accessible to almost all entities that perform service to the system software, while another class of functions be accessible to only specially qualified service entities.

Figure 2:
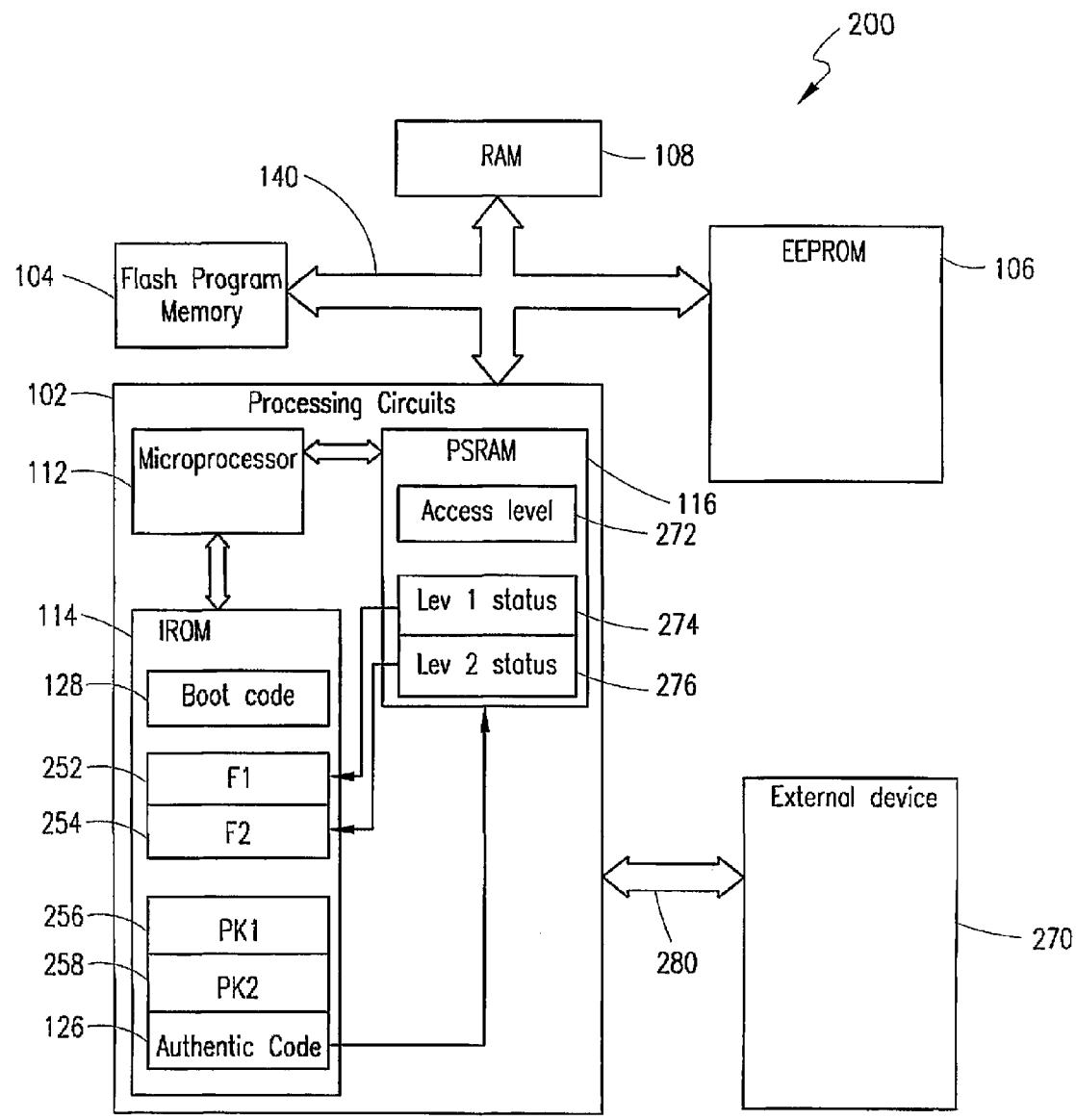
FIG. 2 schematically illustrates an apparatus for providing controlled access to a plurality of functions in the apparatus according to a first embodiment of the present invention.

FIG. 2 schematically illustrates an apparatus for providing controlled access to a plurality of functions in the apparatus according to a first embodiment of the present invention. In particular, FIG. 2 illustrates a cellular telephone processor and memory arrangement of a cellular telephone system 200 which incorporates a protection mechanism for providing secure, leveled access to a plurality of functions in the system.

To assist in explaining the present invention, it is assumed that in the cellular telecommunications system 200, there are two functions available to external entities; function F1 and function F2. It should be understood, however, that this is exemplary only, as the present invention is intended to cover systems having any desired number of available functions Fn.

The function codes for functions F1 and F2 are stored in the IROM 114 of the processing device 102 at locations 252 and 254, respectively; and associated with each of the plurality of functions is a corresponding public key, PK1 and PK2, which are also stored within the IROM 114 at 256 and 258, respectively. An authentication code 126 and the traditional boot code 128 are also stored in the IROM as well. As is illustrated in FIG. 2, in a practical implementation of the invention, only one authentication code is needed by sharing the code among the plurality of functions or levels.

When an external entity, such as device 270 in FIG. 2, wants to access a particular function Fn in the system 200 (in the embodiment of FIG. 2, Fn will be either F1 or F2), it announces during the initial phase of making a contact with the system that it wants this access (communication between the system and the external device is via any appropriate data channel, indicated in FIG. 2 by arrow 280). Towards this end, the external device 270 may send a signal called "n-select" indicating the function (level) choice. Upon receiving the n-select signal, the processing device 102 stores the requested level in PSRAM 116, specifically, in the element 272 designated "Access level"; and then executes the authentication code that uses the access level data to select the correct public key PKn to be used, and performs the authentication process with the selected key.

The internal condition flags corresponding to each function are initially set to the "disabled" state. If the authentication process is successful, the system sets the internal condition flag corresponding to the function Fn to the "enabled" state; and if the process fails, the flag remains in the disabled state. After the authentication process, the status (successful or failed) is stored in the corresponding PSRAM element (Lev 1 status 274 or Lev 2 status 276) depending on the value of the access level. The value of "Lev x status", x=1, 2, affects how the execution of the code for the functions F1 and F2 will progress either automatically or under the influence of data/commands given by the external device 270.

The apparatus of FIG. 2 thus provides a protection mechanism that achieves secure, leveled access control over a plurality of functions capable of being performed by the processing device 102. By having the public keys and the authentication code inside the IROM memory 114 of the processing device 102, it is not possible to manipulate the system in such a way that the authentication mechanism can be bypassed. However, such an approach may be expensive in that it may require adaptation of off-the-shelf processing circuits, such as standard Pentium or ARM processors.

Figure 3:
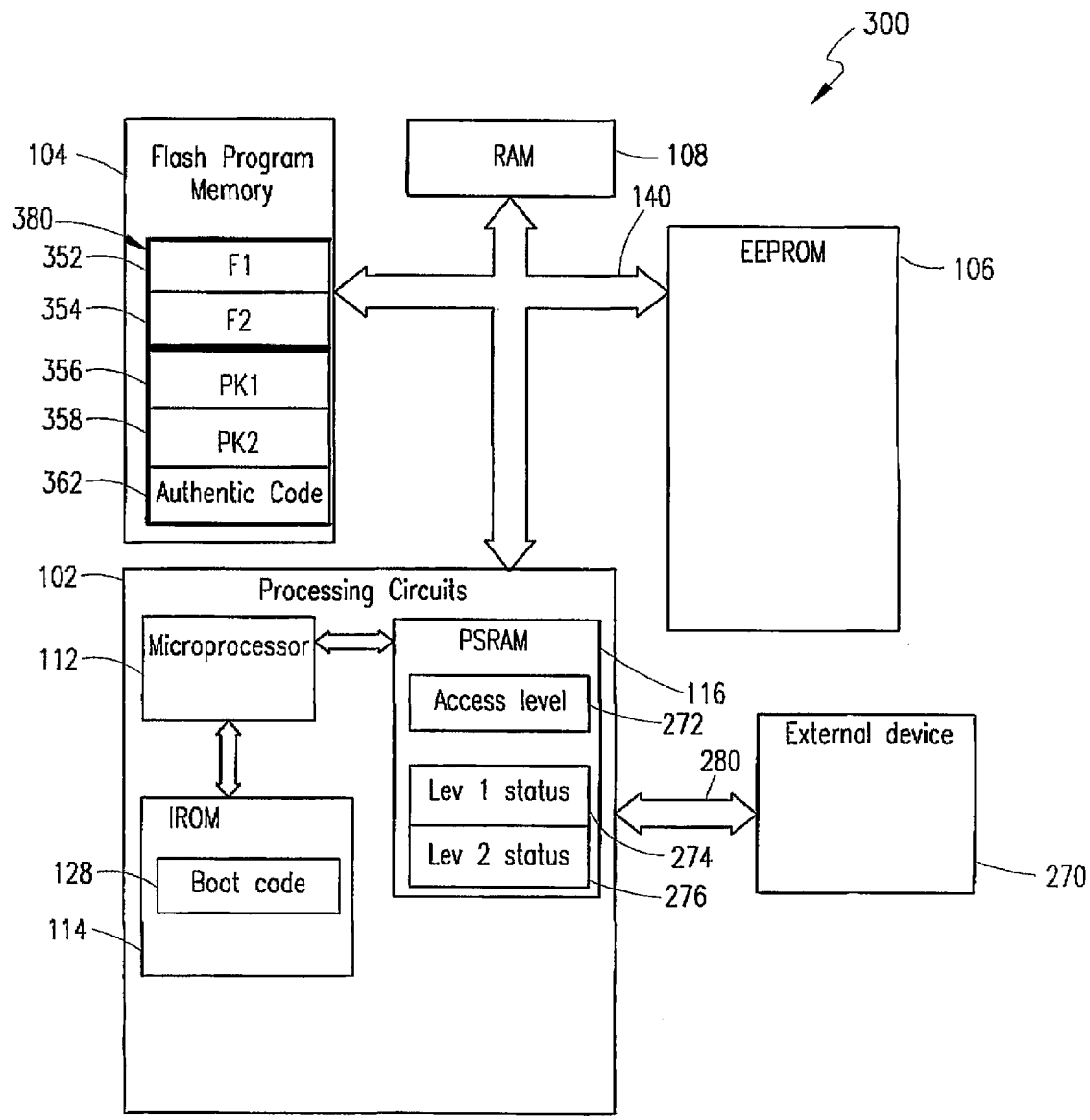
FIG. 3 schematically illustrates an apparatus for providing controlled access to a plurality of functions in the apparatus according to a second embodiment of the present invention.

In view of this possible added expense, a presently more preferred embodiment is to store the public keys and the authentication code in a so-called One-Time-Programmable (OTP) area of the flash program memory. This is illustrated in FIG. 3 wherein the flash program memory 104 of system 300 includes codes for the functions F1 and F2 (stored at 352 and 354, respectively), the corresponding public keys PK1 and PK2 (stored at 356 and 358, respectively) and the authentication code (stored at 362) which are all stored in OTP area 380 of the flash program memory. The IROM 114 in this embodiment continues to store the boot code as shown at 128.

When a function is enabled through a successful authentication process, it may be the case that completion of the function requires some additional input. This would be the case, for example, when the function is the reprogramming of the system's flash program memory, wherein the additional input consists of the programming instructions and flash program data. In such situations where, after the authentication process, additional data must be sent from the external device to the system and/or from the system to the external device; there is no real protection against either passive or active wiretapping. In accordance with further embodiments of the present invention, however, effective protection against wiretapping of the additional data is also provided.

Figure 4:
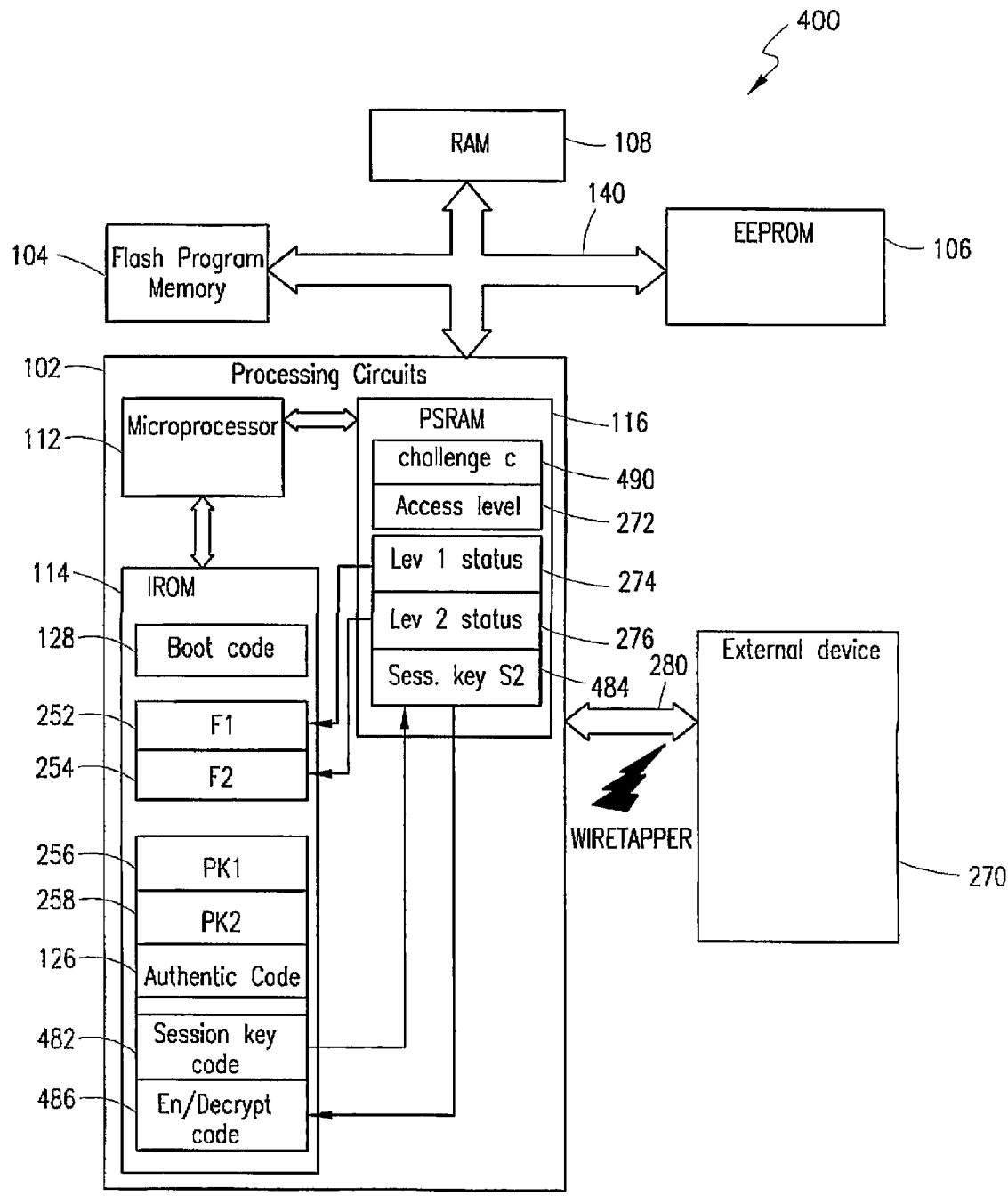
FIG. 4 schematically illustrates an apparatus for providing controlled access to functions in the apparatus and which includes protection against wiretapping according to a third embodiment of the present invention.

In particular, FIG. 4 schematically illustrates an apparatus, according to a further embodiment of the invention, which provides protection against a passive wiretapper that wishes, for example, to monitor the traffic (commands and program code) transferred from the external device 270 to the system 400, or vice versa along data channel 280; as well as against an active wiretapper that may wish to change or substitute sent data. Basically, this additional protection is provided by including an additional program code, referred to as a "session key code". The session key code is stored in the IROM 114, as shown at 482, to compute, after a successful authentication, a shared session key, which may be stored in PSRAM 116 as shown at 484. The procedure for computing this shared session key involves the value of a random challenge c used during the authentication process. The session key is stored internally in the PSRAM 116 of the system's processing device 102 (and also in the external device, as will be explained hereinafter); and the value of the session key is known only to the system and the external device, such that a wiretapper not knowing the session key cannot gain access to the additional data.

More specifically, in the process of authenticating the external device 270, the system 400 in FIG. 4 sends a random challenge c (stored at 490 in PSRAM 116) to the external device 270 and waits for a response. The response is checked by the system towards a reference value the system has computed itself. Examples of such so-called challenge-response authentication schemes include those using symmetric cryptographic primitives as disclosed in *Handbook of Applied Cryptolog*, by A. Menezes, P. C. an Oorschot, and S. A. Vanstone, CRC Press, 1996, which is herein incorporated by reference in its entirety (and is referred to hereinafter as "Handbook"); and the authentication process taught in U.S. Pat. No. 4,748,668, wherein an asymmetric (or public-key) cryptographic primitive is used. This scheme, in particular, has the advantage of not requiring storage of secret keys in the system's non-volatile memory.

The random challenge procedure makes it very unlikely that an external entity, such as external device 270, can achieve authentication simply by replaying a recording of messages sent during a previous, successful authentication process. To obtain protection against wiretapping, the random challenge is used to determine a secret session key that the system shares with the external device that performed the successful authentication. By linking the authentication process to the session key generation process, one can guarantee that the data exchange between the system and the external device is indeed sent by the external device that performed the successful authentication.

An example of a system where such session key generation process is employed is a GSM (Global System for Mobile Communications) cellular telephony system. In that system, the secret keys need to be stored securely somewhere in the mobile device. Another example is the SSL security layer (see U.S. Pat. No. 5,825,890) where an RSA public-key cryptosystem (see U.S. Pat. No. 4,405,829) is used to authenticate an external (server) device and establish a shared secret session key. The RSA method has the disadvantage that the external unit will have the private key which can be used to factorize the composite modulus N into its prime factors PN and QN. Thus, if the same modulus N is used in the public/private keys for different levels, an external unit that is authorized to operate at one level can also operate at another level. Furthermore, the protocol as defined by the RSA method is not a zero-knowledge protocol like the protocol taught in U.S. Pat. No. 4,748,668.

Prior art methods that provide both authentication and a shared secret session key thus have the disadvantage that they require either storage of secret keys or use the RSA method.

To overcome the shortcomings of the prior art methods, the zero-knowledge protocol of U.S. Pat. No. 4,748,668 is expanded to include a method for generating a shared secret session key. Specifically, in U.S. Pat. No. 4,748,668; a modulus N is used that is the product of at least two large prime numbers. In addition to the preparations to set up a system that uses the method taught in U.S. Pat. No. 4,748,668; one chooses a number g such that the order e of g mod N is not small. The order of g mod N is the smallest positive number e such that $g^e$ mod N=1. Such an element can always be found, for example, through the method by Gauss (see R. J. McEliece, "Finite Fields for Computer Scientists and Engineers", Kluwer Academic Publishers, 1987, $2^{nd}$ Printing, 1989, page 38). Furthermore, a function H is introduced which has two inputs r and c such that if r runs through, say, K distinct values, but c is fixed, the output H(r,c) takes approximately K distinct values. Similarly, when c runs through, say, M distinct values, but r is fixed, the output H(r,c) takes approximately M values. An example of such a function is the exclusive-or (XOR) of two binary strings (assuming that r and C are represented by binary valued strings), i.e., if $r=r_1, r_2, \ldots, r_n$ and $c=c_1, c_2, \ldots, c_m$, $m<=n$,
$r_i, c_j E\{0,1\}$ $$H(r, c) = \begin{cases} r_1 + c_1 & 1 \leq i \leq m \\ r_1 & m+1 \leq i \leq n \end{cases}$$

Another more secure, and thus preferred, selection is to take H to be a cryptographic hash (or message digest function) and have it operate on the two inputs r and c, for example, $$H(r, c) = sha-1(r_1, r_2, \ldots, r_n, c_1, c_2, \ldots, c_m) \quad (1)$$

where sha-1( ) is the cryptographic hash function as specified in the FIPS-181-1 Secure Hash Function standard.

When now, an external device wants to communicate with the system, it will first perform an authentication process. When successful, the external device generates a random value r1 (for convenience, we let r1 denote the integer number and r1 the binary string representing this number); and performs a Diffie-Hellman agreement (as taught in U.S. Pat. No. 4,200,770, see also "Handbook"). Thus, the external device computes $y1 = g^{r1}$ mod N and sends this value to the system, and the system generates a random value r2$i$ and sends $y2=g^{r2}$ mod N to the external device.

Then, the external device computes $k1=(y2)^{r1}$ mod N and the system computes $k2=(y1)^{r2}$ mod N. Since $k1=(y2)^{r1}$ mod $N=g^{r2 \times r1}$ mod $N=g^{r1 \times r2}$ mod $N=(y1)^{r2}$ mod N=k2, the external device and the system share the identical values k1 and k2. The external device uses k1 together with the random challenge c received from the system during the authentication process as inputs to compute the session key S1=H(k1,c). The system computes a session key S2=H(k2,c) which equals S1 since k1=k2. Since the external device cannot have computed k1 prior to the authentication process and since the values of S1 and S2 depend on the random challenge used in the authentication process, the session keys are fresh and linked to the (successful) authentication.

Note that now, the same value of N can be used for public/private key pairs associated with the different levels, thus reducing storage space and costs.

It should also be appreciated that other key agreement protocols than the Diffie-Hellman key agreement can also be employed, if desired, and it is not intended to restrict the invention in this regard.

The established session key, which may be stored in PSRAM 116 at 484, can now be used to encrypt the data sent between the external device and the system (the encryption/decryption code is stored in IROM 114 as shown at 486, or it may be stored in the one-time programmable part 380 of the flash program memory 104 as described with reference to FIG. 3). This will protect the data against a passive attacker that wiretaps the data channel 280 between the external device 270 and the system 400. If the code for the authentication mechanism and the encryption/decryption is stored in the system in a manner that the code cannot be modified or bypassed, the protection is in place even if one cannot fully trust the user of the system.

The apparatus illustrated in FIG. 4 thus provides a significant degree of added protection against wiretapping, both passive and active, inasmuch as a potential wiretapper will not know the shared session key. The apparatus of FIG. 4, however, can be yet further augmented to provide an even greater degree of protection against a potential active wiretapper who may wish to substitute or change data sent from the external device to the system. In particular, FIG. 5 schematically illustrates yet a further embodiment of the present invention to provide increased protection against an active wiretapper by adding MAC (Message Authentication Code) protection.

Figure 5:
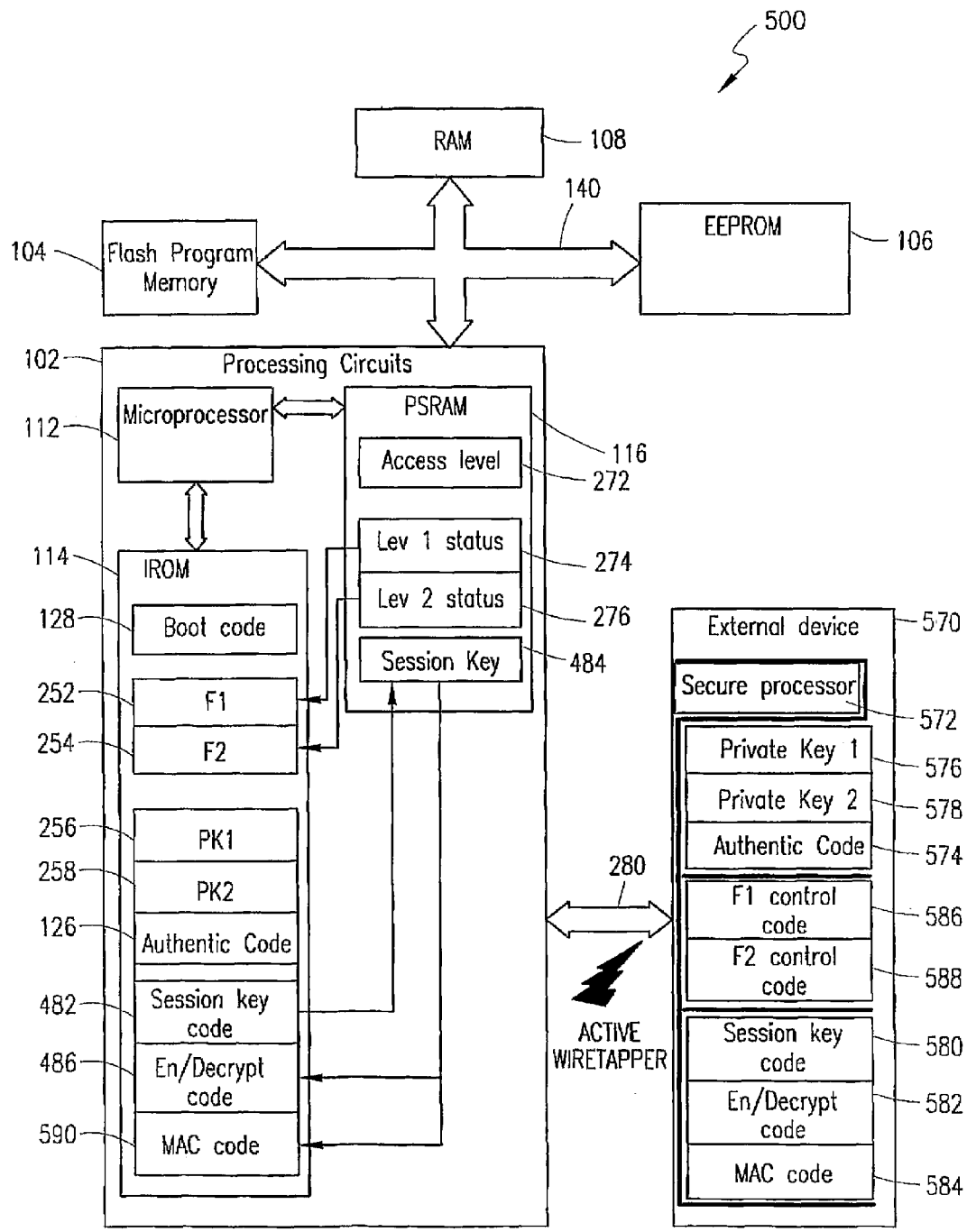
FIG. 5 schematically illustrates an apparatus for providing controlled access to functions in the apparatus and which includes additional protection against active wiretapping according to a fourth embodiment of the present invention.

Specifically, as shown in FIG. 5, the external device 570 includes a secure processor 572, having the code for the authentication 574 and private keys 576 and 578, the session key code 580, an encryption/decryption code 582, MAC operations code 584, and control codes 586, 588 for the two functions F1 and F2. The codes for F1 And F2 may be void if the function Fx is autonomic, i.e., will execute automatically after authentication at level x without needing additional input from the external device. The system also includes the MAC code in IROM 114 as shown at 590; or again, the MAC code could be stored in the one-time programmable part 380 of the flash program memory 104 of FIG. 3.

In the embodiment of FIG. 5, if the attacker is an active wiretapper, i.e., an attacker who attempts to insert data or substitute sent data with his/hers/its own data; the use of the MAC will detect such attacks with a high degree of certainty. The availability of the secret session key allows the use of a wide range of MACs. For example, one can use HMAC as specified in "Handbook".

It should also be understood that a MAC can be used together with or without encryption of the data in the data channel between the external device and the system.

When employing a MAC, such as, for example, HMAC ("Handbook", page 355), the data transmitted is of the form data object, HMAC(Sx, data object)

where Sx is either S1 or S2 depending on the origin of the data object, and whether the data object is clear text data or encrypted data. The receiver checks the received data object by also computing HMAC(Sy, received object data) using its own session key value Sy. Since Sx Sy as a result of a successful authentication, the two HMAC values will be identical if "data object"="received data object".

Figure 6:
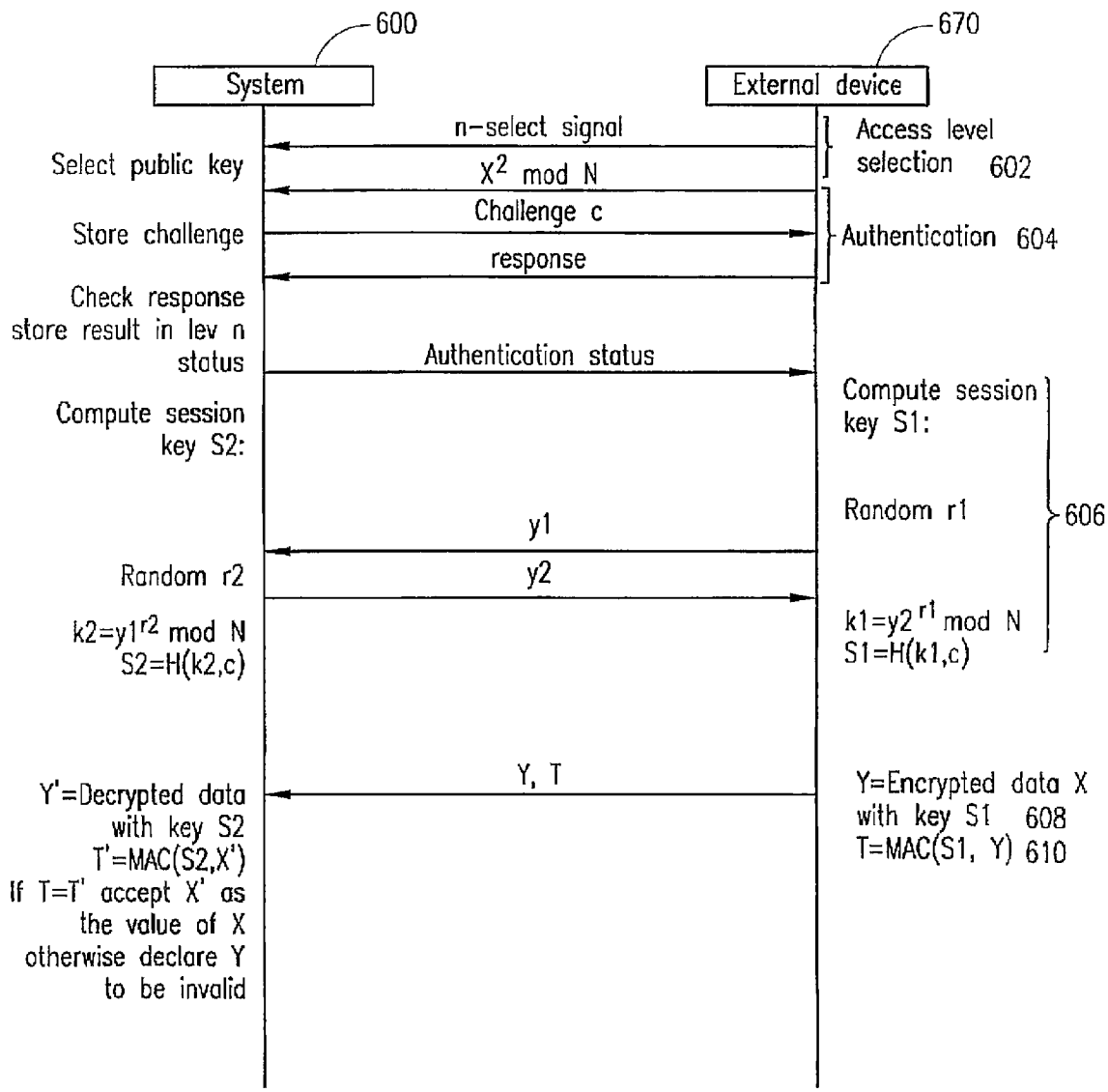
FIG. 6 schematically illustrates the message flow between the apparatus of FIGS. 2–5 and an external device during connection setup.

FIG. 6 illustrates an overview of the messages sent between a system 600 and an external device 670 during the first phase of the access. Shown are the level selection 602, the authentication 604, the session key generation 606, the data encryption/decryption 608, and the MAC protection computation 610. In FIG. 6, it is assumed that the selected public key contains the modulus N and that the external device wants to send the data object to the system.

It should be emphasized that the term "comprises/comprising" when used in this specification is taken to specify the presence of stated features, integers, steps or components; but does not preclude the presence or addition of one or more other features, integers, steps, components or groups thereof.

It should also be emphasized that while what has been described herein constitute presently preferred embodiments of the invention, it should be recognized that the invention can take numerous other forms. Accordingly, it should be understood that the invention should be limited only insofar as is required by the scope of the following claims.

The invention claimed is:

1. A method for providing controlled access to a desired function in a system that includes a plurality of functions, the method comprising:
   dividing the plurality of functions into a plurality of groups;
   assigning a corresponding key to each group;
   receiving an access request from an external entity, said access request including one of the assigned keys;
   conducting an authentication process for the external entity, using the key received in the access request; and
   upon positively authenticating the external entity, granting the entity access only to the functions in the group corresponding to the key received in the access request, while prohibiting access to functions in other groups.

2. The method according to claim 1, wherein each of said corresponding keys comprises a public key.

3. The method according to claim 1, wherein each of said corresponding keys, an authentication code and codes for said plurality of functions are stored in a memory of said system.

4. The method according to claim 3, wherein said memory comprises an internal read-only memory (IROM).

5. The method according to claim 3, wherein said memory comprises a one-time programmable part of a non-volatile program memory.

6. The method according to claim 1, wherein said step of conducting an authentication process includes conducting a first authentication process using the key received in the access request, and wherein said method further comprises conducting a second authentication process using a second key, which is generated using a second key code created during the first authentication process.

7. The method according to claim 6, wherein said second key comprises a session key computed by said system and the external entity seeking access.

8. The method according to claim 7, wherein said second authentication process includes comparing said session keys computed by the system and the external entity, wherein access to the corresponding group of functions by said entity is authorized only if said compared session keys match.

9. The method according to claim 7, wherein said second key code is created using a random challenge sent to said entity by said system during the first authentication process.

10. The method according to claim 6, wherein said second key is stored in a protected static random access memory (PSRAM) of said system.

11. A method for providing controlled access to a desired function in a system that includes a plurality of functions, each of the plurality of functions having a corresponding key associated therewith, the method comprising:
    selecting a key corresponding to the desired function;
    conducting a first authentication process using the selected key;
    conducting a second authentication process using a second key, which is generated using a second key code created during the first authentication process, said second key being a session key computed by the system and an entity seeking access to the desired function;
    controlling access to the desired function according to a result of the authentication process; and
    encrypting and decrypting data sent between the entity and the system using the session key.

12. The method according to claim 11, wherein an algorithm code for the encryption and decryption of data is stored in an internal read-only memory (IROM) of said system.

13. The method according to claim 11, wherein an algorithm code for the encryption and decryption of data is stored in a one-time programmable part of a non-volatile program memory of said system.

14. The method according to claim 11, wherein an algorithm code for the encryption and decryption of data is stored in said entity.

15. The method according to claim 7, wherein said method further includes the step of adding Message Authentication Code (MAC) protection for data transmitted between the system and the entity, said MAC protection utilizing said session key.

16. The method according to claim 15, wherein an algorithm code for MAC protection is stored in an internal read-only memory (IROM) of said system.

17. The method according to claim 15, wherein an algorithm code for MAC protection is stored in a one-time programmable part of a non-volatile program memory of said system.

18. The method according to claim 15, wherein an algorithm code for MAC protection is stored in said entity.

19. The method according to claim 1, wherein said system comprises a cellular telephone system.

20. A method for providing controlled access to a desired function in a system that includes one or more functions, said method comprising:
    conducting a first authentication process with an external entity using a public key corresponding to the desired function;
    conducting a second authentication process using a private session key, which is shared by the system and the external entity and is generated based on a random challenge made by the system to the external entity during the first authentication process;

controlling access to the desired function according to a result of the first and second authentication processes; and encrypting and decrypting data sent between the external entity and the system using the private session key.

21. The method according to claim 20, wherein an algorithm code for the encryption and decryption of data is stored in an internal read-only memory (IROM) of said system.

22. The method according to claim 20, wherein an algorithm code for the encryption and decryption of data is stored in a one-time programmable part of a non-volatile program memory of said system.

23. The method according to claim 20, wherein an algorithm code for the encryption and decryption of data is stored in said external entity.

24. An apparatus for providing controlled access to a desired function in a system that includes a plurality of functions, said apparatus comprising:

means for dividing the plurality of functions into a plurality of groups;

a memory for storing a plurality of corresponding keys, each key being assigned to a different group of functions;

means for receiving an access request from an external entity, said access request including one of the assigned keys; and a processor for conducting an authentication process for the external entity using the key received in the access request, and upon positively authenticating the external entity, granting the entity access only to the functions in the group corresponding to the key received in the access request, while prohibiting access to functions in other groups.

25. The apparatus according to claim 24, wherein said plurality of keys comprises public keys.

26. The apparatus according to claim 24, wherein said memory comprises an internal read-only memory (IROM).

27. The apparatus according to claim 24, wherein said memory comprises a one-time programmable part of a non-volatile program memory.

28. The apparatus according to claim 24, wherein the processor conducts a first authentication process using the key received in the access request, and wherein said processor further conducts a second authentication process using a second key which is generated using a second key code created during the first authentication process.

29. The apparatus according to claim 28, wherein said second key comprises a shared session key shared by said system and the external entity seeking access.

30. The apparatus according to claim 28, wherein said second key is stored in a protected random access memory (PSRAM) of said system.

31. The apparatus according to claim 24, wherein said system comprises a cellular telephone system.

32. The method according to claim 1, wherein the plurality of groups of functions are of different hierarchical levels, wherein access to a higher level provides access to the functions associated with the higher level and to the functions associated with all lower levels.

33. The apparatus according to claim 24, wherein the plurality of groups of functions are of different hierarchical levels, wherein access to a higher level provides access to the functions associated with the higher level and to the functions associated with all lower levels.

* * * * *

UNITED STATES PATENT AND TRADEMARK OFFICE
CERTIFICATE OF CORRECTION

PATENT NO. : 7,058,806 B2
APPLICATION NO. : 09/821533
DATED : June 6, 2006
INVENTOR(S) : Smeets et al.

It is certified that error appears in the above-identified patent and that said Letters Patent is hereby corrected as shown below:

On The Page, Item (75), delete "Bernhard" and insert -- Bernard --, therefor.

In Column 6, Line 40, delete "Cryptolog" and insert -- Cryptology --, therefor.

In Column 7, Line 38, delete "E" and insert -- € --, therefor.

In Column 9, Line 8, delete "Sx Sy" and insert -- Sx=Sy --, therefor.

Signed and Sealed this

Eighteenth Day of December, 2007

JON W. DUDAS
*Director of the United States Patent and Trademark Office*